Patented Mar. 15, 1949

2,464,772

UNITED STATES PATENT OFFICE 2,464,772

SPONGE-FORMING COMPOSITIONS

Nicolas Drisch, Paris, France, assignor, by mesne assignments, to Societe Novacel, Paris, France, a corporation of France No Drawing. Application November 28, 1945, Serial No. 631,473. In France June 16, 1943

Section 1, Public Law 690, August 8, 1946
Patent expires June 16, 1963

2 Claims. (Cl. 106—122)

This invention relates to the manufacture of porous cellulosic articles. More particularly, it relates to the preparation of artificial sponges from viscose.

In manufacturing artificial sponges from viscose, a thick viscose is intimately mixed with fibers, which form the reinforcing network, and pore-forming substances such as soluble or fusible granules so as to obtain a substantially homogeneous pasty or plastic mass. This plastic mass is shaped into the desired form and coagulated. Preferably, after the coagulation of the shaped mass, the pore-forming granules are removed whereby pores are formed in the product.

The pore-forming component of the composition is fusible or soluble whereby it can be easily removed either by fusion or washing. Glauber's salt (decahydrated sodium sulphate) is usually employed as the pore-forming ingredient in artificial sponge-forming compositions since it is readily soluble in water, the aqueous baths serving for the coagulation-fixation of the viscose, and because it melts in its water of crystallization at 34° C., which facilitates washing.

Decahydrated sodium sulphate is generally obtained by crystallizing acid solutions of the salt. However, the resulting crystals are not perfect. They have cavities and inclusions. It is difficult to obtain large perfect crystals and the resultant crystallized mass usually consists of relatively small agglomerated crystals.

In the production of artificial viscose sponges, it is desired that the pore-forming material be of relatively uniform size. Accordingly, the decahydrated sodium sulphate prior to incorporation in the viscose sponge-forming composition is broken up roughly and then sifted. Crystals larger or smaller than the desired size are eliminated. The larger crystals are broken up further and the smaller ones are redissolved for a new crystallization unless they can be used in the manufacture of artificial viscose sponges having a pore size different from a standard size. The too large and the too small crystals thus represent a loss or an increase in production cost.

Further, in preparing the sponge-forming compositions, the components are subjected to vigorous and strenuous agitation and mixing. Decahydrated sodium sulphate is relatively friable and, during the preparation and working-up of the sponge-forming composition, the crystals thereof break up into smaller crystals which, in turn, result in the formation of small pores together with the pores resulting from the unbroken crystals. Consequently, there is a more or less great irregularity in the size of the pores, which constitutes a defect in the appearance of the artificial sponges. It is to be observed that the irregularity in the size of the pores does not detract from the quality and utility of the sponge to any material extent. However, a more or less considerable loss results when the working-up operation leads to more intensive breaking of the crystals, with the formation of scales or even crystalline dust. Such scales and dust because of their small volume are prevented from acting effectively on the surrounding viscose and only produce either too small or poorly formed pores in the product.

Attempts have been made to re-crystallize sodium sulphate from a neutral aqueous medium in order to obtain large crystals. In such crystallization operations, large crystals only form if the crystallization is carried out very slowly. Such procedure is far too expensive and, moreover, does not yield absolutely perfect crystals.

An object of this invention is to provide an improved composition for the preparation of porous articles, such as artificial sponges.

Another object of this invention is to provide a sponge-forming composition containing an improved pore-forming material.

An additional object of this invention is to provide a sponge-forming composition containing a pore-forming ingredient in the form of large hard crystals which will resist and withstand the forces to which it is subjected during the preparation and working-up of the sponge-forming composition.

A further object of this invention is to provide a sponge-forming composition containing soluble or fusible granular material in the form of large hard crystals which are of relatively uniform size and which do not appreciably break up during the preparation and working-up of the composition.

A still further object of this invention is to provide an improved process for the manufacture of artificial sponges.

A still further object of this invention is to provide an artificial sponge in which the pores are substantially uniform in size.

Other and additional objects will become apparent hereinafter.

The objects of the invention are, in general, obtained by utilizing as the pore-forming component in an artificial sponge-forming composition granules of solidified fused dehydrated sodium sulphate. According to one procedure for the preparation of the pore-forming component, decahydrated sodium sulphate crystals are heated sufficiently so that they will melt in their water of crystallization and thus form a melt. Thereafter, the molten mass is chilled to form a solid mass, which is subsequently crushed to form granules of desired size.

In the preferred embodiment of the invention, a paste-like melt of the decahydrated sodium sulphate is made by liquefying (fusing) only a part of the crystals. Upon cooling, the molten portion fuses the residual crystals together, forming a substantially solid mass which is subsequently reduced to the desired particle size.

The pore-forming ingredient can be prepared in various ways. In the preferred form, a paste-like melt of partially fused decahydrated sodium sulphate is produced. The partially molten mass, which is of a viscosity so that it can be poured, is flowed in an extremely thin layer onto a chilled movable surface whereby a solidified crystalline layer is produced. The crystalline layer is removed from the removable surface by means of a scraper. The solidified plaque-like pieces thus obtained are crushed, for example, with a mill having pin-headed plates and the granules are sized. The granules of the desired size are then utilized as the pore-forming component of an artificial sponge-forming composition, which also contains a cellulose derivative such as viscose, and fibers. The sponge-forming composition is molded into the desired shape. Thereafter, the shaped article is coagulated, washed, and finished by known procedures.

The details and manner of practicing the invention will become apparent from the following specific example, it being understood that this example is an illustrative embodiment of the invention and that the scope of the invention is not limited thereto. Throughout the examples, the proportions are parts by weight unless otherwise specified.

*Example*

Decahydrated sodium sulphate crystals are heated with agitation to produce a partial melt having a viscosity of 55 centipoises. The mass is poured to form a 9 millimeter layer on the cylindrical wall of a rotating drum 1.50 meters in diameter. The drum is cooled internally to −1° C. by means of brine and, after solidification of the melt, the crystalline layer is removed from the drum by means of a scraper. The material which has been removed from the drum is then crushed in any convenient manner and the granules sifted.

400 grams of the sifted granules of a particle size of from 8 to 12 millimeters in diameter are worked-up with a mixture of 280 grams of viscose containing 10% of cellulose and 30 grams of fibers cut into lengths of approximately 7 centimeters. The resultant pasty or plastic mass is molded in the form of blocks of desired size. The blocks are coagulated with a sodium sulphate solution at 95° C. and then washed and finished by known procedures.

The artificial sponges thus obtained are of excellent quality and have very uniform polyhedric pores.

During the partial fusion of the decahydrated sodium sulphate, the mass thereof is agitated. Automatic control of the melting can be provided by means of an electric connection acting upon the power consumed by the agitator immersed in the partly molten mass and causing interruption of the heating, and possibly pouring of the mass onto the pouring surface, when the mass has acquired the desired viscosity. The melting may be carried out continuously in a rotating tubular device provided with suitable and regulated heating mechanisms.

The hardness of the solidified fused mass, and hence the granules produced therefrom, can be increased by elimination of part of the water of crystallization or by increasing the anhydrous salt content of the mass, as, for example, by homogeneously incorporating sodium sulphate containing less than 10 molecules of water of crystallization per molecule of sodium sulphate, such as, anhydrous sodium sulphate or partially dehydrated sodium sulphate to the partially or wholly molten mass prior to the solidification thereof by chilling. In all cases, care is taken to prevent the formation of a salt deposit in the molten mass by not exceeding the point of maximum solubility (34° C.) and, when anhydrous salt is added, the quantity thereof should not exceed 50% corresponding to 8 molecules of water per molecule of sodium sulphate.

Though in the example the decahydrated sodium sulphate crystals are heated to produce a partial melt having a viscosity of 55 centipoises, the invention is not restricted to such specific viscosity. The viscosity depends on the degree of fusion of the decahydrated sodium sulphate crystals. In general, crystals of decahydrated sodium sulphate which have been heated to produce a melt in its own water of crystallization having a viscosity of from 50 to 500 centipoises have given satisfactory results. Usually, the viscosity of the melt depends on the extent of the fushion and the procedure for solidifying the melt to form the solid mass.

The size of the pore-forming granules depends on the desired size of the pores in the product. In general, large size pores are obtained by the use of granules of a particle size which passes through a 17 millimeter mesh screen and retained on an 8 millimeter mesh screen. For smaller pores, granules of a particle size passing through 8 millimeter mesh screen and remaining on a 4 millimeter mesh screen can be used.

The invention has been specifically described in connection with decahydrated sodium sulphate. In place of decahydrated sodium sulphate, alkali metal salts, rich in water of crystallization and fusible, can be used. Sodium acetate trihydrate, sodium carbonate decahydrate, trisodium phosphate dodecahydrate, disodium phosphate dodecahydrate, potassium sodium tartrate tetrahydrate, potassium fluoride dihydrate, and sodium thiosulphate pentahydrate are illustrative examples of alkali metal salts rich in water of crystallization and which can be employed in the process.

Though hemp fibers constitute the preferred fibers in the sponge-forming composition, other fibers, such as linen, jute, cotton and the like, can be used. The fiber can be of any appropriate short lengths, such as, for example, from 1 to 10 centimeters.

While the sponges contemplated by this invention are preferably produced by the coagulation of viscose, they can also be prepared by the coagulation of other esters, such as cellulose nitrate or cellulose acetate, or cellulose ethers, such as ethyl or benzyl cellulose. The invention, therefore, is also applicable to these other cellulose derivatives.

The instant invention provides a pore-forming substance which is capable of being incorporated in a cellulosic derivative, and particularly a viscose, sponge-forming composition without any substantial breaking up thereof. The pore-forming substance is sufficiently hard and non-friable so that it will effectively resist breaking up during the vigorous and strenuous mixing employed in the preparation of the sponge-forming composition.

The instant invention provides a double economy. In the first place, the procedure of producing the granules by the instant invention is cheaper than that used in the prior art; and secondly, a better yield of large size crystals is obtained by the instant process than in the prior art procedure. It should be observed that the increased power consumption involved by the breaking up of the solid fused masses which are harder than the material crystallized in aqueous medium is negligible. The pore-forming granules obtained by the instant invention are practically free of imperfections, cavities and inclusions usually present in the sodium sulphate used by the prior art and obtained by crystallizing the used spinning baths from rayon yarn production. Improved uniformity of granule size of the pore-forming substance of this invention is obtained even though such granules are more resistant to breaking up than the granules of the prior art. Moreover, the solid mass of fused material breaks up more uniformly than do crystals obtained by crystallization in an aqueous medium.

Since it is obvious that many changes and modifications can be made in the above-described details without departing from the nature and spirit of the invention, it is to be understood that the invention is not to be limited thereto except as set forth in the appended claims.

I claim:

1. A sponge-forming composition comprising viscose, reinforcing fibers and granules of a pore-forming substance, said pore-forming substance having a hardness such as to resist breaking up during the preparation of the composition and comprising uniform size granules consisting of the product obtained by partially melting crystals of decahydrated sodium sulfate in their own water of crystallization to form a viscous mass, partially dehydrating said viscous mass, cooling the same to re-solidify the mass and forming granules of said uniform size from said re-solidified mass.

2. A sponge-forming composition comprising viscose, reinforcing fibers and granules of a pore-forming substance, said pore-forming substance having a hardness such as to resist breaking up during the preparation of the composition and comprising uniform size granules consisting of the product obtained by partially melting crystals of decahydrated sodium sulfate in their own water of crystallization to form a viscous mass, incorporating therein solid sodium sulfate crystals containing less than 10 molecules of water of crystallization, cooling the mass to re-solidify the same and forming granules of said uniform size from said re-solidified mass.

NICOLAS DRISCH.

REFERENCES CITED

The following references are of record in the file of this patent:

UNITED STATES PATENTS

| Number | Name | Date |
| --- | --- | --- |
| 217,460 | Harrison | July 15, 1879 |
| 478,067 | Penniman | June 28, 1892 |
| 1,883,447 | Ammen | Oct. 18, 1932 |
| 1,886,580 | Pierce | Nov. 8, 1932 |
| 2,054,520 | Pierce | Sept. 15, 1936 |
| 2,105,380 | Speijer | Jan. 11, 1938 |
| 2,117,392 | Banigan | May 17, 1938 |
| 2,133,805 | Brown | Oct. 18, 1938 |
| 2,374,755 | Kisch | May 1, 1945 |